R. C. TOWNSEND.
TRANSMISSION GEARING.
APPLICATION FILED JUNE 29, 1910.
1,004,714.
Patented Oct. 3, 1911.
4 SHEETS—SHEET 3.
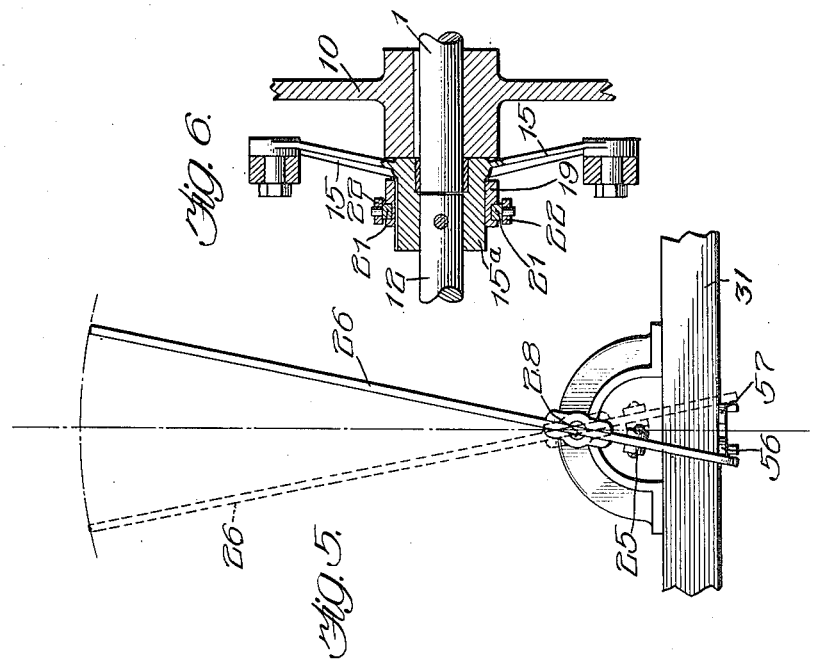
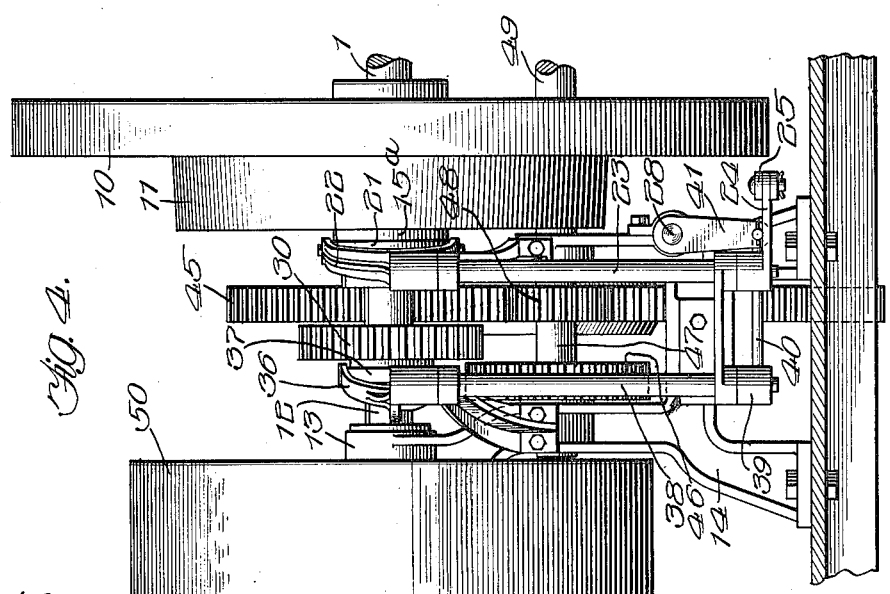

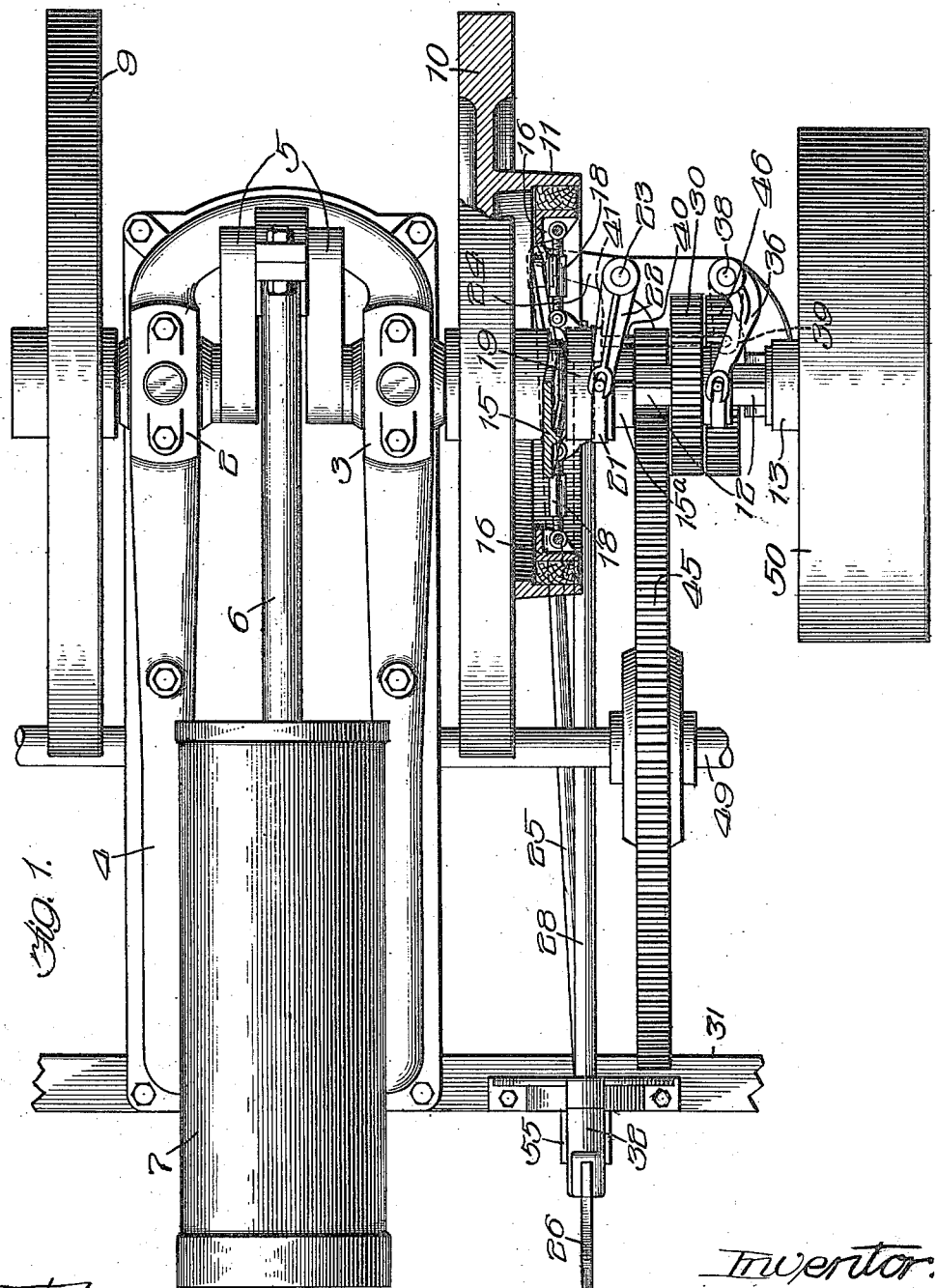

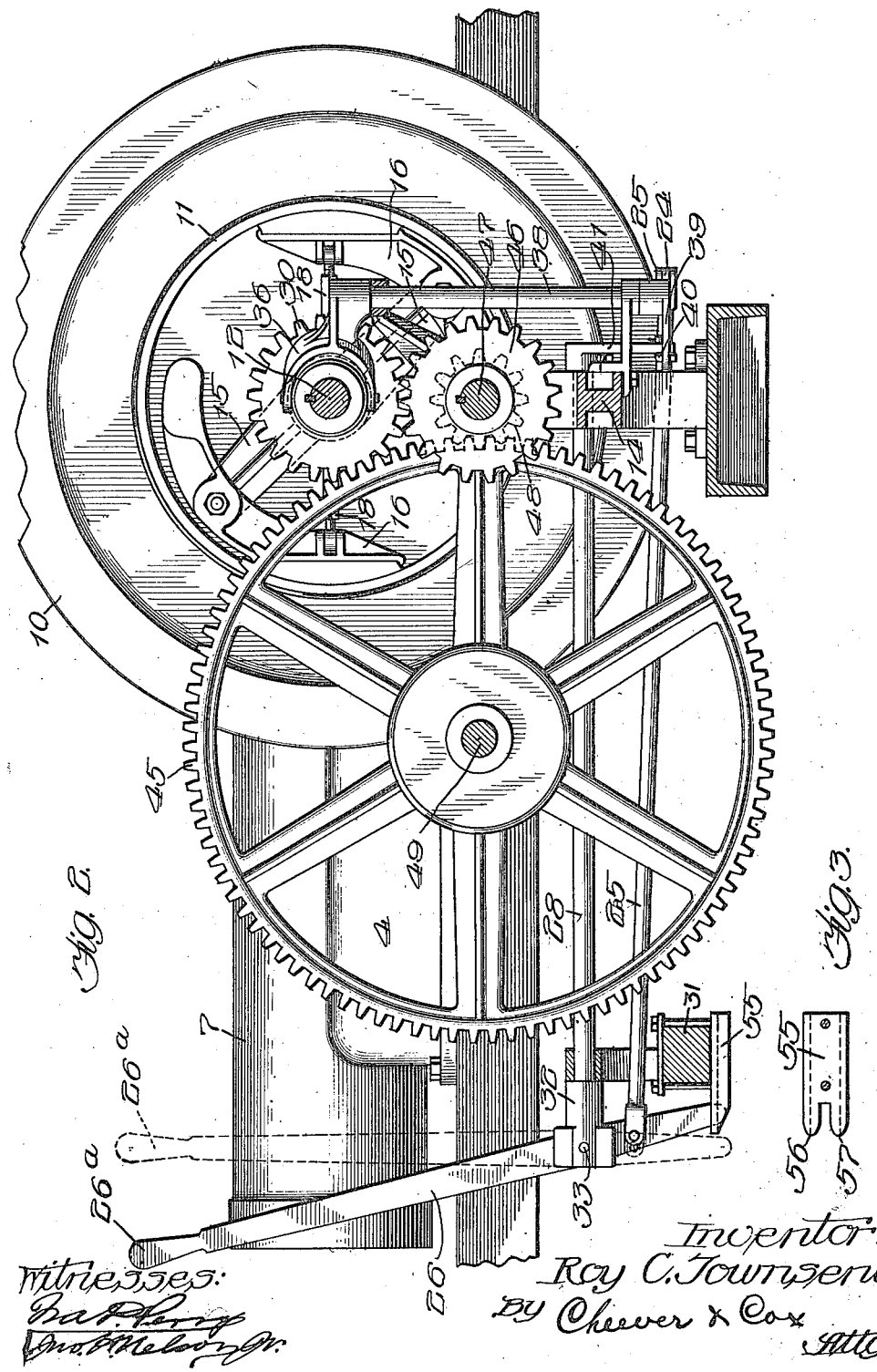

R. C. TOWNSEND.
TRANSMISSION GEARING.
APPLICATION FILED JUNE 29, 1910.
1,004,714.
Patented Oct. 3, 1911.
4 SHEETS—SHEET 4.
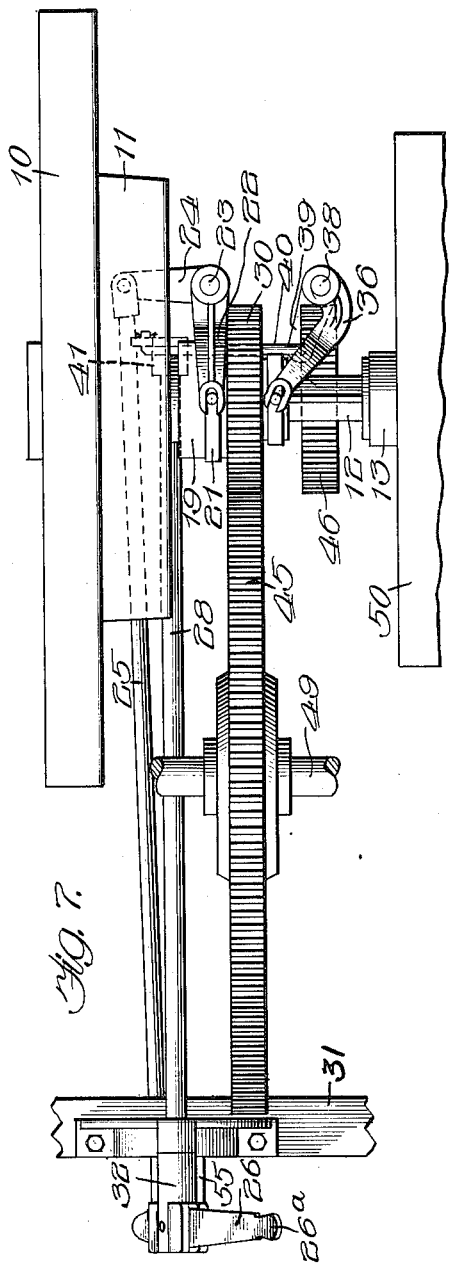
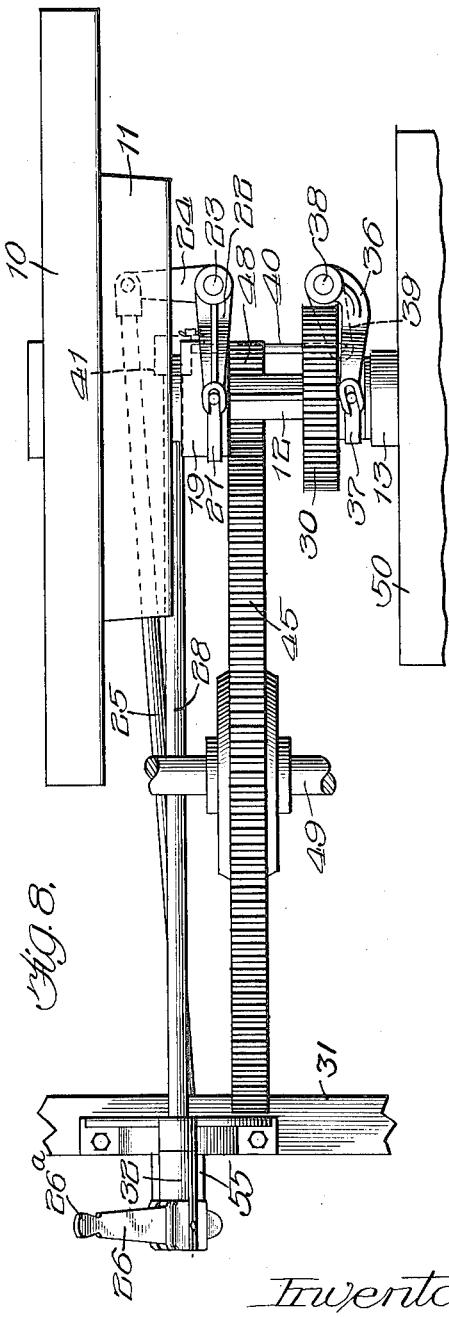
Witnesses:
Inventor:
Roy C. Townsend.
By Cheever & Cox
Attys;

UNITED STATES PATENT OFFICE.

ROY C. TOWNSEND, OF BELOIT, WISCONSIN, ASSIGNOR TO FAIRBANKS, MORSE AND COMPANY, OF CHICAGO, ILLINOIS, A CORPORATION OF ILLINOIS.

TRANSMISSION-GEARING.

1,004,714.  Specification of Letters Patent.  Patented Oct. 3, 1911.

Application filed June 29, 1910. Serial No. 569,589.

*To all whom it may concern:*

Be it known that I, ROY C. TOWNSEND, a citizen of the United States residing at Beloit, in the county of Rock and State of Wisconsin, have invented a certain new and useful Improvement in Transmission-Gearing, of which the following is a specification.

My invention relates to transmission gearing, and is especially applicable to internal combustion traction engines.

The object of my invention is to provide mechanism in which: (a) A single operating lever controls the friction clutch for transmitting power and controls the change gears for reversing the direction of rotation of the driven members. (b) The operating mechanism is so arranged that the gears cannot be changed when the friction clutch is applied, and the friction clutch cannot be applied until the sliding pinion has completely arrived at its proper position. This prevents the operator from throwing full power from the engine to the gears without utilizing the full width of the gear teeth. (c) A single friction clutch serves both for traction and belt work. (d) The speed forward is greater than the speed on reverse. I obtain my objects by the mechanism illustrated in the accompanying drawings, in which:

Figure 1 is a plan view of an engine provided with mechanism embodying my invention. Fig. 2 is a side elevation thereof. Fig. 3 is a plan of the locking plate which locks the operating lever. Fig. 4 is an end elevation looking from the right end of Figs. 1 and 2. Fig. 5 is an elevation of the operating lever and its support, looking toward the right in Fig. 1. Fig. 6 is a fragmentary detail chiefly in section showing a portion of the crank shaft of the engine and the adjacent portion of the transmitting shaft. Figs. 7 and 8 are plan views of the change or reversing gearing, showing the parts in different positions.

The following is a description of the particular form of mechanism selected to illustrate the invention, similar numerals referring to similar parts throughout the several views: The main engine shaft 1 is supported in suitable bearings 2, 3 forming part of the frame 4 of the engine. Said shaft is driven by means of cranks 5 connected by a rod 6 to a piston reciprocating within the engine cylinder 7. The main shaft is provided with fly wheels 9 and 10, the latter having a clutch ring 11 integral therewith or rigidly secured thereto. A secondary shaft 12 is mounted in alinement with the main shaft, being supported at the outer end in an outboard bearing 13, which forms a part of the auxiliary frame 14. Said shaft is held in alinement at the inner end by means of the hub 15$^a$ of the spider 15. As best shown in Fig. 6, the ends of both of the shafts project into said hub which holds them in alinement and yet permits shaft 1 to rotate without necessarily rotating shaft 12.

Hub 15$^a$ is pinned, or otherwise rigidly secured, to the secondary shaft 12 so that said shaft will rotate when the spider 15 is rotated. Said spider forms part of an ordinary friction clutch, there being clutch arms 16 pivotally connected to the spider in position to engage the clutch ring 11. Said arms are operated by means of links 18 connected to the ring 19, which is longitudinally slidable upon the hub 15$^a$. Said ring is feather keyed upon the hub, and is shifted by means of a non-rotary ring 21 set in a groove in ring 19 and operated by means of the shifting arms 22. Said arms are operated by means of the vertical shaft 23 journaled in the auxiliary frame 14 above mentioned. Said shaft is operated by a crank 24 connected by a rod 25 to the operating lever 26.

Operating lever 26 has a handle 26$^a$ at its upper end and is mounted in such manner as to be rotatable for a limited distance in two planes located approximately at right angles to each other. The movement in one plane produces an approximately longitudinal movement of the rod 25 and throws the clutch into and out of engagement with the clutch ring. The movement in the other plane produces a rotary movement of the shaft 28 for shifting the sliding pinion 30 as will be presently described. In the particular construction illustrated, shaft 28 is journaled at one end in the auxiliary frame 14 and at the other end in an auxiliary frame 31. A forked hub 32 is rigidly secured to shaft 28 adjacent to frame 31 and carries a pin 33 which forms a fulcrum for the operating lever.

Pinion 30 is feather-keyed upon shaft 12 and is shifted by arms 36 operating a non-rotary ring 37 let into the hub of the pinion.

Said arms are fastened to the upright shaft 38 journaled in frame 14 and operated by a crank 39 connected to a link 40 connected to a crank 41 fastened to shaft 28. Pinion 30 is capable of occupying three positions, to-wit; first, in engagement with the main gears 45; second, in engagement with the reduction gear 46; and, third, in intermediate or non-acting position out of engagement with either of them. These positions are illustrated respectively in Figs. 7, 8 and 1 of the drawings. Gear 46 is fastened to a jack-shaft 47 to which is fastened a pinion 48 which meshes with gear 45. When the sliding pinion is in engagement with gear 45, the shaft 49 to which said gear is fastened will be rotated forward, and when said pinion is in engagement with gear 46 said shaft will be rotated in reverse direction at slower speed. In a traction engine, for which the invention is especially adapted, shaft 49 will furnish the power for traction, while for ordinary power purposes the band wheel 50 will be utilized, this band wheel being fastened directly to the secondary shaft 12.

A stationary locking plate 55, shown separately in Fig. 3, is so located as to engage the lower end of the operating lever 26 when the latter is in what may be termed " on " position, indicated by full lines, Fig. 2. When the lever is in " off " position, indicated by dotted lines, Fig. 2, it is disengaged from said plate and free to move laterally to rotate shaft 28. When the lever is " on " the clutch is in acting condition, and when the lever is " off " the clutch is released. In the selected form of mechanism, the movement of the lever to on or off positions is in a direction approximately lengthwise of rod 25 and shaft 28 and, therefore, this may be considered as the longitudinal movement of the lever.

In the present design the locking plate has two horns 56 and 57, and when the lever is at the outside of one of them the pinion 30 will be in one of its extreme positions, and when at the outside of the other of them the pinion will be at the other of its extreme positions, and when between them the pinion will be in intermediate non-acting position. The sliding or shifting movement of the pinion in the present case is limited in one direction by the bearing 13 and in the other direction by the hub 15ª.

As a result of the above described construction, the sliding pinion cannot be shifted except when the clutch is off, and the clutch cannot be thrown on until said pinion has been shifted completely into alinement with one of the gears 45, 46 or to intermediate position.

In operation, when it is desired to drive the traction shaft 49 forward the lever handle 26ª is first thrown longitudinally to off position, and then swung laterally toward the extreme right, as shown in Fig. 7. While the handle is being swung laterally the clutch is off and shaft 12 will be disconnected from the main engine shaft 1. Thereupon the lever handle will be thrown longitudinally to on position, which will throw the clutch on and cause the gear 45 and shaft 49 to be driven in the forward direction. To produce reverse rotation of shaft 49 the operator releases the lever from the locking plate, throws the lever handle to the left, thereby shifting the sliding pinion into mesh with gear 46, as shown in Fig. 8, and then moves the lever longitudinally to on position, thereby throwing in the clutch and locking the lever. If the operator wishes to utilize the engine for ordinary power purposes he first releases the operating lever, thus throwing the friction clutch off, then moves the lever to intermediate position, thus bringing the sliding pinion 30 into intermediate non-acting position, then moves the lever so that its lower end will be engaged between the horns 56 and 57 of the locking plate, thus locking it and throwing the clutch into action. In the latter case the band wheel 50 will be rotated but no movement will be imparted to the traction shaft 49.

It will thus be seen that, as a result of my invention, the apparatus is completely controlled by a single operating lever and that the operator has the choice of driving the traction shaft either forward or reverse at slower speed, or of throwing the traction shaft out of gear entirely and driving only the band wheel 50. During the act of changing the mechanism from one condition to another the friction clutch is released so that power from the engine shaft will be transmitted only when the desired change has completely taken place, thus avoiding strain until the gears are completely in alinement and the teeth in mesh their full width.

Having thus described my invention, what I claim as new and desire to secure by Letters Patent is:—

1. In mechanism of the class described, the combination of a driving shaft, a secondary shaft having a fixed axis of rotation, a clutch for connecting them, a plurality of reversing gear wheels having fixed axes parallel to the secondary shaft, said reversing wheels being geared together and arranged in different parallel planes, a sliding pinion upon said secondary shaft always rotating therewith and adapted to be shifted into engagement with either one of said reversing gear wheels and out of engagement with both of them, whereby said gear wheels may be driven or not at the option of the operator, a band wheel on said secondary shaft always rotating therewith, whereby power may be delivered when the reversing gear wheels are idle, a rock shaft and a pull rod, one for operating said clutch and the other for shifting said pinion, and a hand lever adapted to operate both the rock shaft and the pull rod.

2. In mechanism of the class described, the combination of a driving shaft, a secondary shaft having a fixed axis of rotation, a clutch for connecting them, a plurality of reversing gear wheels geared together and having fixed axes parallel to the secondary shaft, said reversing wheels being arranged in different parallel planes, a sliding pinion upon said secondary shaft always rotating therewith and adapted to be shifted into engagement with either one of said reversing gear wheels and out of engagement with both of them, a rock shaft and a pull rod, one for operating said clutch and the other for shifting said pinion, said rock shaft being longitudinally fixed and said pull rod being nonrotatable, and a hand lever fulcrumed upon said rock shaft and adapted to both rotate the rock shaft and move the pull rod longitudinally.

3. In mechanism of the class described, the combination of a driving shaft, a secondary shaft having a fixed axis of rotation, a clutch for connecting them, a plurality of reversing gear wheels geared together and having fixed axes parallel to the secondary shaft, said reversing wheels being arranged in different parallel planes, a sliding pinion upon said secondary shaft always rotating therewith and adapted to be shifted into engagement with either one of said reversing gear wheels and out of engagement with both of them, a longitudinally fixed rock shaft adapted to shift said pinion, a nonrotatable pull rod adapted to operate said clutch, and an operating lever fulcrumed upon said rock shaft and connected to said pull rod for operating said rock shaft and pull rod.

4. In a traction engine, in combination, a traction shaft, a main gear thereon, a reverse gear connected thereto out of alinement with the main gear, a main shaft, a secondary shaft, all of said shafts having fixed axes, a sliding pinion rotated by and slidable upon said secondary shaft to three principal positions, to-wit, one in mesh with the main gear, one in mesh with the reverse gear, and one out of mesh with either; a clutch for transmitting power from the main to the secondary shaft, a handle, connections between said handle and said clutch for operating the latter, and connections between said handle and said sliding pinion for sliding said pinion.

In witness whereof, I have hereunto subscribed my name in the presence of two witnesses.

ROY C. TOWNSEND.

Witnesses:
   Geo. B. Ingersoll,
   Margaret Brown.